United States Patent [19]

Brentham

[11] 4,291,787

[45] Sep. 29, 1981

[54] EXERCISING DEVICE WITH DOUBLE ACTING HYDRAULIC CYLINDER

[76] Inventor: Jerry D. Brentham, P.O. Box 599, Belton, Tex. 76513

[21] Appl. No.: 12,874

[22] Filed: Feb. 16, 1979

[51] Int. Cl.³ .................. A63B 21/00; F16F 9/18
[52] U.S. Cl. ........................ 188/318; 188/314
[58] Field of Search ............ 272/130; 188/314, 315, 188/317, 318, 319

[56] References Cited

U.S. PATENT DOCUMENTS

| 1,307,502 | 6/1919 | Knudson | 188/318 |
| 2,036,623 | 4/1936 | Focht | 188/315 |
| 2,048,285 | 7/1936 | Padgett | 188/318 X |
| 2,519,605 | 8/1950 | Rossman | 188/315 |

Primary Examiner—Duane A. Reger
Attorney, Agent, or Firm—Gerald G. Crutsinger; John F. Booth; Harry C. Post, III

[57] ABSTRACT

An exercising device comprising a frame, actuating means, and a double acting hydraulic cylinder used therewith. The hydraulic cylinder includes a container having first and second chambers and passageways for placing the chambers in fluid communication with one another. A piston is slideably mounted within the first chamber and valve means are mounted with the container for preventing fluid communication into the first chamber when the piston is moved in a first direction and for preventing fluid communication around the piston when the piston is moved in a second direction. A piston rod extends into the container for moving the piston in response to movement of the actuating means. A control means governs the fluid flow through a selected passageway from the first to the second chamber to regulate the amount of force necessary to move the actuating means during exercise of a portion of the body.

7 Claims, 15 Drawing Figures

EXERCISING DEVICE WITH DOUBLE ACTING HYDRAULIC CYLINDER

BACKGROUND AND BRIEF SUMMARY OF THE INVENTION

It is well known that exercising devices generally serve two purposes, the strengthening and rehabilitation of muscles. The older exercising devices generally use a series of pulleys and ropes for lifting weights. However, a recent development has been the use of a frame that supports a body, actuating means mounted with the frame for movement by a portion of the body, and a double acting hydraulic cylinder that resists movement of the actuating means and thereby strengthen or rehabilitate the muscles in the portion of the body moving the actuating means. Some examples of these exercising devices are: a "Neck Exerciser" disclosed in U.S. Pat. No. 4,066,259, issued on Jan. 3, 1978; a "Leg Exerciser" disclosed in patent application Ser. No. 790,051, filed on Apr. 22, 1977; and a "Leg Curl Exercising Device", disclosed in patent application Ser. No. 914,356, filed on June 12, 1978. The information relating to the operation and use of these devices is to be incorporated herein by reference.

Although these exercising devices work exceedingly well with the conventional double acting hydraulic cylinders, they are not as effective as desirable because no specific double acting hydraulic cylinder has been developed for use in such devices or that permits control of the amount of force necessary to move the actuating portion of the exercising devices.

Accordingly, it is an object of the present invention to provide an exercising device and a double acting hydraulic cylinder which resists movement in either direction of a slideably mounted piston as a piston rod attached to the piston is moved into or out of the cylinder.

Further, it is an object of the present invention to provide an exercising device and a double acting hydraulic cylinder which controls the amount of opposing force in the cylinder which thereby regulates the necessary force applied through a piston rod attached to a piston in the cylinder to move the rod into or out of the cylinder.

In accordance with the invention, an exercising device comprises a frame for supporting a human body, actuating apparatus mounted with the frame for movement by the portion of the body, and a double acting hydraulic cylinder connected to the frame for resisting movement of the actuating apparatus. The cylinder includes a container with first and second chambers for supporting a fluid disposed therein and passageways for placing the chambers in fluid communication with one another. A piston is slideably mounted within the first chamber for acting on the fluid disposed therein and the piston has a passageway for placing a portion of the first chamber on one side of the piston in fluid communication with the portion of the first chamber on the other side. A piston rod extends from the piston out of the container for moving the piston in response to movement of the actuating means and valve means are used for limiting fluid flow through a selected passageway from the first chamber to the second chamber. A control means is connected to the cylinder for governing the fluid flow through the selected passageway to regulate the amount of force necessary to move the actuating means.

Also in accordance with the invention, a double acting hydraulic cylinder comprises an inner tube disposed within an outer tube. Head and base members are used to close the ends of the tubes with each head and base member having a passageway for placing fluid disposed within the inner and outer tubes in communication. A piston is slideably mounted within the inner tube for acting on the fluid disposed therein and has a passageway extending therethrough for placing the fluid on one side of the piston in fluid communication with the fluid on the other side. A piston rod for moving the piston is mounted with the piston and extends through the head member to displace fluid in the inner tube. A first valve is mounted in the base member passageway to prevent fluid communication therethrough when the piston is moved toward the base member and a second valve is mounted in the piston passageway for preventing fluid communication therethrough when the piston is moved toward the head member. The valves and piston rod, thus, coact so that fluid in the inner tube will always flow through the head member passageway to the outer tube when the piston is moved.

BRIEF DESCRIPTION OF THE DRAWINGS

Other objects and advantages of the invention will become apparent upon reading the following detailed description and upon reference to the drawings, in which like reference numerals are used throughout to designate like parts.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
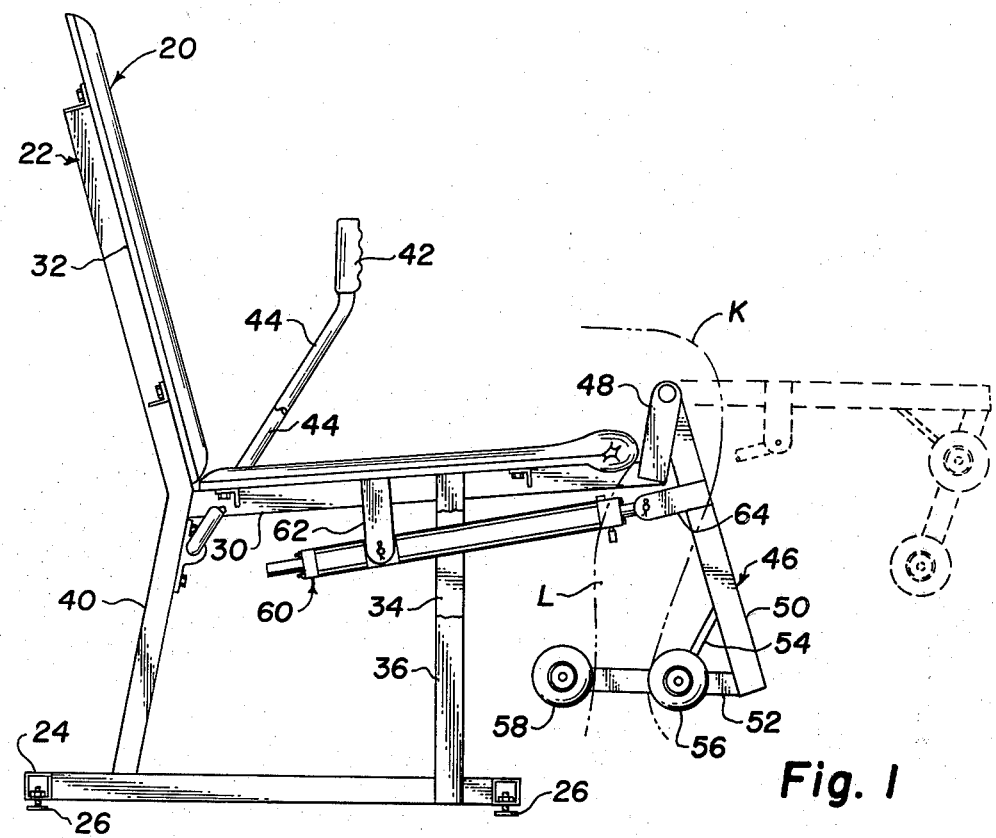
FIG. 1 is an elevational view of an exercising device constructed according to the present invention.
Figure 2:
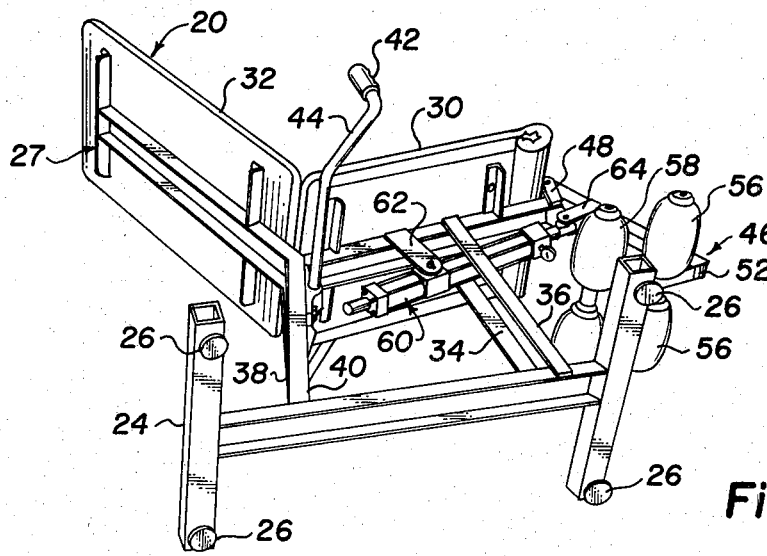
FIG. 2 is a bottom, perspective view of the device shown in FIG. 1.

Turning now to FIGS. 1 and 2, there is shown a device 20 for exercising a portion of the human body which includes a frame 22 for supporting the human body. Frame 22 includes an H-shaped base 24, with a foot 26 threadedly joined at the outer end of each arm of the base, and a chair portion 28 which has a seat portion 30 and back portion 32 supported by front legs 34, 36 and back legs 38, 40 extending up from the cross member of base 24. A pair of hand grips for limiting movement of the body during exercising are positioned on each side of seat 30 by use of bracing rods 44 connected to back legs 38 and 40.

An actuating device 46 is provided at the front of seat 30 for exercising a leg "L" in both for and aft movement. Actuating device 46 includes a pair of mounting arms 48 connected to the front end of seat portion 30 which pivotally mounts a lever 50 in alignment with the joint of knees "K". An arm 52 is mounted to the outboard end of lever 50 and supported by brace 54. A front pair of padded rollers 56 and a rear pair of padded rollers 58 are connected to arm 52 so that an ankle of the user will be held by a front and rear roller on each side of arm 52.

A double acting hydraulic cylinder 60 is used to resist movement of actuating means 46 when moved by the user between the extended position, shown in dotted outline in FIG. 1, and the relaxed position, shown in solid outline. Hydraulic cylinder 60 is pivotally attached between a lever 62 which is fastened to seat 30 of frame 22 and to a lever 64 fastened to actuating means 46.

Figure 3A:
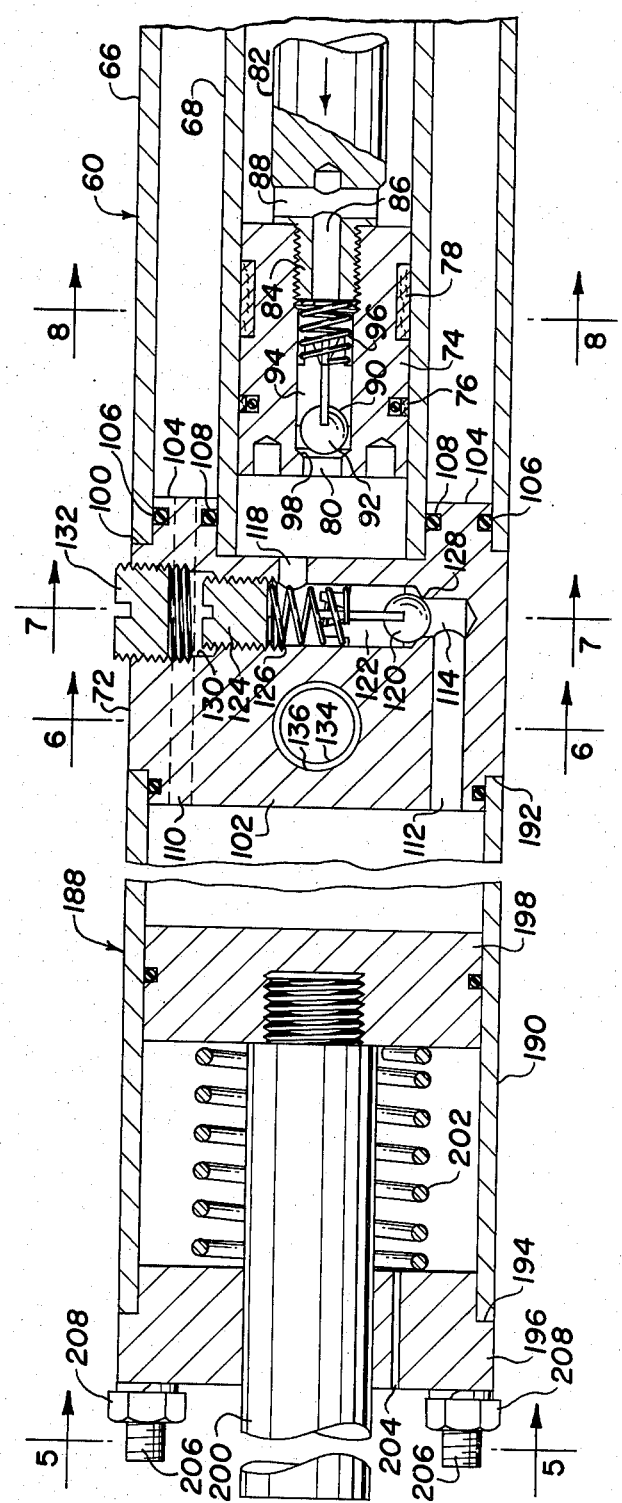
FIGS. 3a and 3b are elevational views, partly in section and with parts broken away, of a double acting hydraulic cylinder constructed according to the present invention in a first operational mode.
Figure 3B:
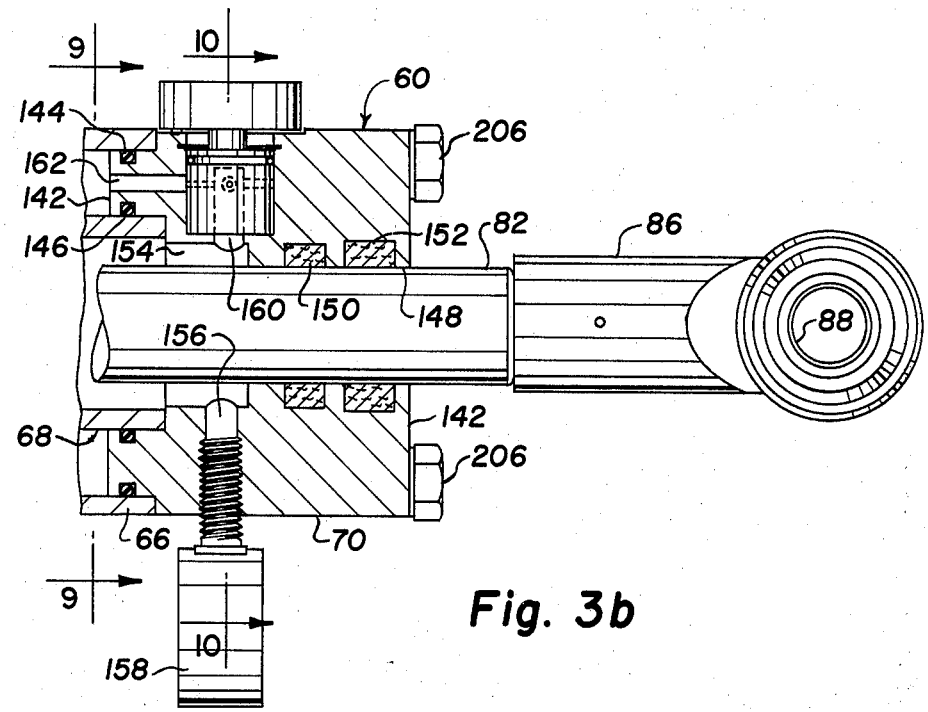
Figure 4:
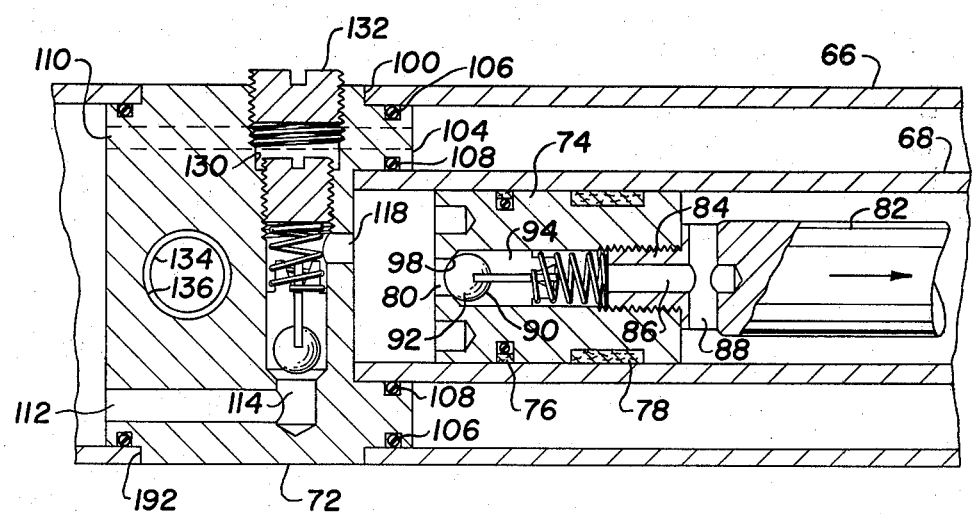
FIG. 4 is a elevational view of a portion of the invention shown in FIG. 3a, but in a second operational mode.

Turning now to FIGS. 3a, 3b and 4 double acting hydraulic cylinder 60 is shown with actuating means 46 being moved from the extended to the retracted position (FIG. 3a) and with actuating means 46 being moved from retracted to extended positions (FIG. 4). Hydraulic cylinder 60 has an outer tube 66 and an inner tube 68 concentrically disposed within the outer tube and both tubes extend between a head member 70 and base member 72. This arrangement forms a first chamber within the inner tube and a second chamber within the annulus between the inner and outer tubes.

A cylindrical piston 74 for acting on any fluid disposed within the first chamber is slideably mounted within inner tube 68. Mounted about the outer periphery of piston 74 is an O-ring 76 to prevent fluid communication around the outside of the piston and a ring 78 to limit the wear of the piston as it is moved within inner tube 68. A passageway 80 for placing a portion of the first chamber on one side of the piston in fluid communication with the portion of the first chamber on the other side extends concentrically through cylindrical piston 74.

A piston rod 82 for moving the piston 74 extends through head member 70 and has a first end with a male member 84 for extending into passageway 80 to threadedly engage female threads on the piston. A passageway 86 extends through male member 84 to join with cross passageway 88 for permitting communication of the fluid between the two portions of the first chamber. The other end of piston rod 82 is connected to a bracket 86 which, includes a hole 88 permitting a pin to be inserted therethrough for mounting rod 82 to lever 64 of actuating device 46.

A check valve 90 is mounted within passageway 80 of piston 74 to prevent fluid communication through the piston passageway when the piston is moved toward head member 70 while permitting fluid communication through piston passageway 80 when piston 74 is moved toward base member 72. Preferably, the body of check valve 90 is formed by piston 74 and has a ball 92 supported by a four finned support 94 which permits fluid to flow therethrough. A spring 96 extends between support member 94 and male member 84 of rod 82 for urging ball 92 toward a valve seat 98 provided by an annularly extending shoulder in passageway 80.

As best shown in FIGS. 3a, 4, 6 and 7, base member 72 has a first surface 100 and a second surface 102 facing outwardly of one another. An elevated shoulder 104 extends away from first surface 100 for receiving the ends of the outer and inner tubes. An outer O-ring 106 and an inner O-ring 108 are provided on the outer and inner surfaces of elevated shoulder 104 to prevent leakage between the junction of base member 72 and the outer and inner tubes. A passageway 110 extends through base member 72 from first surface 100 to second surface 102 and a second base member passageway 112 extends from second surface 102 into a valve inlet port 114.

A check valve 116 for preventing fluid communication through base member passageway 112 when the piston moves toward the base member while permitting fluid communication through base member passageway 112 when the piston moves toward the head member is mounted within base member 72. The body of valve 116 is formed by base member 72 and passageway 114 is the valve inlet port and an outlet port 118 permits fluid flow out of the valve into the first chamber. Check valve 116 has a ball 120 held by a four finned support 122 which permits fluid flow therethrough. A plug 124 is threadedly connected to base member 72 and a spring is mounted between plug 124 and support 122 for urging ball 120 against a valve seat provided by an annular shoulder 128 on base member 72. Extending outwardly of plug 124 is an access passage 130 which has a closing plug 132 threadedly connected therein.

Bearings 134 are mounted in a passageway 136 which extends transversely through base member 72 so that a pin extends through passage 136 for mounting base member 72 to lever 62.

Figure 9:
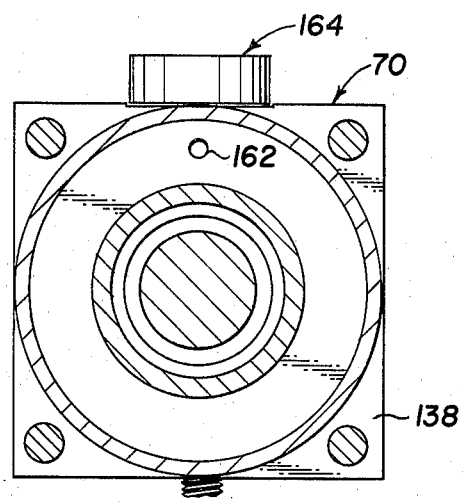
FIG. 9 is a view of the invention shown in FIG. 3b taken in the direction of arrows 9—9.
Figure 10:
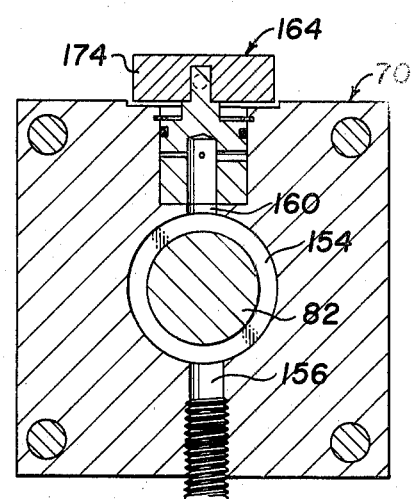
FIG. 10 is a view of the invention shown in FIG. 3b taken in a direction of arrows 10—10.
Figure 11:
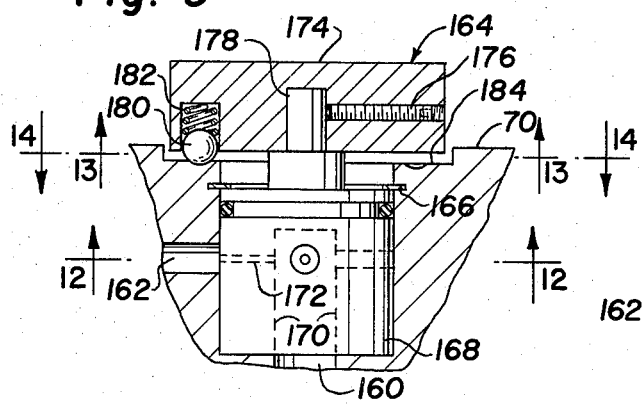
FIG. 11 is an enlarged sectional view of a portion of the invention shown in FIG. 3b.
Figure 12:
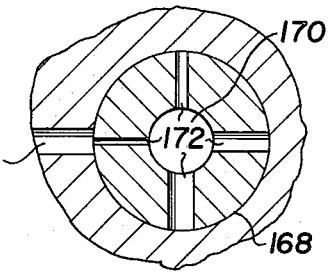
FIG. 12 is a view of the portion of the invention shown in FIG. 11 taken in the direction of arrows 12—12.
Figure 13:
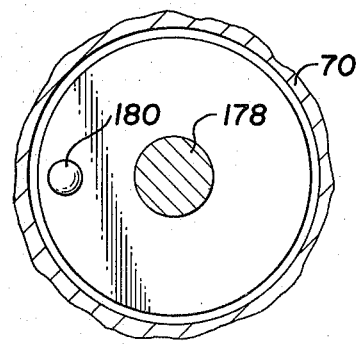
FIG. 13 is a view of the portion of the invention shown in FIG. 11 taken in the direction of arrows 13—13.
Figure 14:
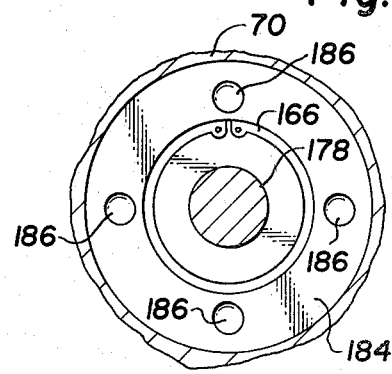
FIG. 14 is a view of the portion of the invention shown in FIG. 11 taken in the direction of arrows 14—14.

As best shown in FIG. 3b, 9 and 10, head member 70 has a first surface 138 facing first surface 100 of base member 72 and a second surface 140 facing away from first surface 138. An elevated shoulder 142 is provided on first surface 138 for receiving the other end of the outer and inner tubes. An outer O-ring 144 and an inner O-ring 146 are provided on the outer and inner surfaces of elevated shoulder 142 to seal head member 70 to the outer and inner tubes. A first passageway 148 extends through head member 70 concentrically of the outer and inner tubes for receiving piston rod 82 therethrough and a sealing ring 150 and a wiping ring 152 are mounted within the passageway concentrically of piston rod 82. A second passage 154 is disposed concentrically of first passageway 148 to form an annulus around piston rod 82 within head member 70. A gauge passageway 156 extends through one side of head member 70 for receiving a gauge 158 which indicates the amount of pressure being exerted within the first chamber. A control passageway 160 extends from a side opposite gauge passageway 156 to annulus 154 and communicates with a passageway 162 which extends through elevated shoulder 142 thereby placing the first and second chambers in fluid communication.

As best shown in FIGS. 3b and 10-14, apparatus 164 is used to control the amount of fluid flow from the inner tube to the outer tube and is connected to head member 70 by use of a snap ring 166. Apparatus 164 includes a tubular portion 168 having a longitudinal passageway 170 for receiving fluid from passageway 160 and at least one control orifice 172 extending through the wall of the tubular portion 168 for regulating the flow of fluid into passageway 162. Preferably, there are four orifices 172 of varying cross-sectional areas extending radially through the side of tubular member 168 so that the amount of force necessary to move the piston 174 can be changed.

In order to register each of the orifices 172 in alignment with passageway 162, it is necessary that some form of indicator be provided. In this instance, a control knob 174 is connected by a set screw 176 to stem 178 of control apparatus 164. A ball mounted within a passage of knob 174 is urged by a spring 182 toward a facing surface 184 of head member 70. Four recesses 186 are provided within facing surface 184 so that as knob 174 is rotated and ball 180 nests in a selected recess, one of the orifices is registered with passageway 162.

Figure 5:
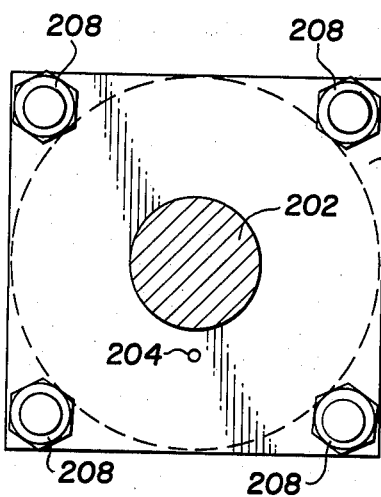
FIG. 5 is a view of the invention shown in FIG. 3a taken in the direction of arrows 5—5.
Figure 6:
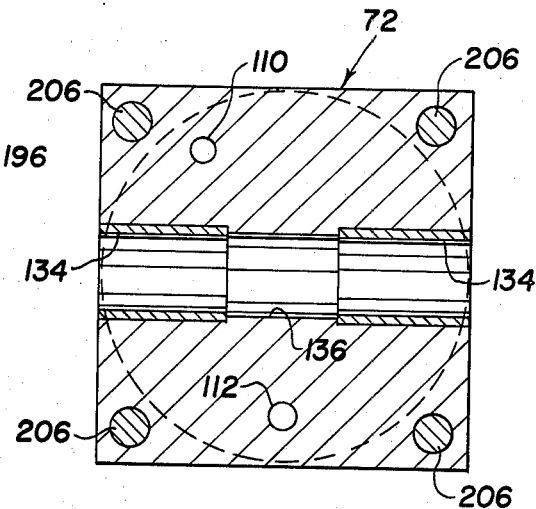
FIG. 6 is a view of the invention shown in FIG. 3a taken in the direction of arrows 6—6.
Figure 7:
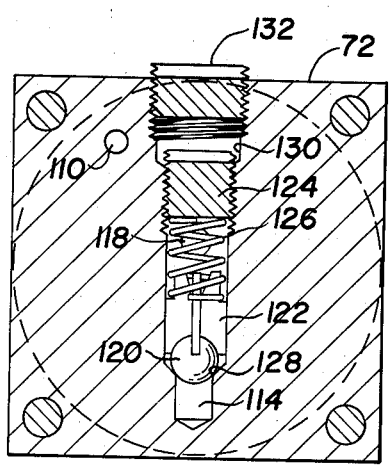
FIG. 7 is a view of the invention shown in FIG. 3a taken in the direction of arrows 7—7.
Figure 8:
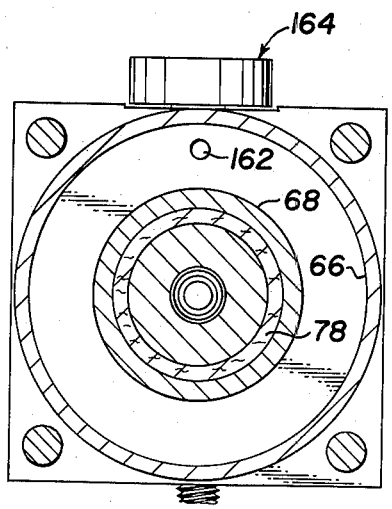
FIG. 8 is a view of the invention shown in FIG. 3a taken in a direction of arrows 8—8.

As best shown in FIGS. 3a and 5, an accumulating reservoir 188 for storing a quantity of fluid is mounted in fluid communication with the fluid in outer tube 66. This is accomplished by use of a tube 190 mounted between a channel 192 formed in second surface 102 of base member 72 and a channel 194 cut into an end cap 196. A plug 198 is moveably disposed within tube 190 for accumulating variations and volumetric changes as the fluid flows from the second chamber via passageway 110 into first chamber via passageway 112. A guide rod 200 is threadedly connected to plug 198 and extends through a passageway in end cap 196 to cooperate therewith and prevent plug 198 from becoming wedged within tube 190. A spring 202 is mounted between end cap 196 and plug 198 to urge plug 198 toward base member 72 with sufficient force to insure fluid flow into the first chamber as piston 74 is moved toward head member 70. A vent 204 is provided through end cap 196 to prevent atmospheric changes to effect movement of plug 198.

Preferably, head member 70, base member 72 and end cap 196 are made to have four corners which extend past the diameter of outer tube 66 and accumulating tube 190. Four holes extend through these corners for receiving bolts 206 through the head member, base member and end cap and a nut 208 is screwed onto each bolt 206 for fastening the component parts of the hydraulic cylinder 20 together.

In operation, a person will adjust the force setting on hydraulic cylinder 60 by turning knob 174 on control apparatus 164. He will then sit down on exercising device 20, position his ankles between padded rollers 56 and 58, grip handles 42 and then extend and retract his leg for a specified number of times over a specified period of time. As the user extends his legs, actuating means 46 moves from position shown in solid outline in FIG. 1 to the position shown in dotted outline. As shown in FIG. 4, this causes piston 74 to be moved toward head member 70 which closes piston valve 90 to permit fluid flow from the first chamber through passageway 160, selected orifice 172 and passageway 162 into the second chamber and, opens base member valve 116 to permit fluid flow from accumulator 118 through passageway 112, inlet port 114 and outlet port 118 into the first chamber. As the user retracts his legs, actuating means 46 moves from the dotted position to the solid position. As shown in FIG. 3a, this movement causes piston 74 to be moved toward base member 72 which closes base member valve 116 to prevent fluid flow therethrough into accumulator 188 and opens piston valve 90 to permit fluid communication between the two portions of the first chamber, since piston rod 82 moves into the first chamber, fluid again flows from the first chamber through passageway 160, selected orifice 172 and passageway 162 into the second chamber. Accordingly, hydraulic cylinder 60 resists movement of actuating means 46 in either direction, which causes the user to exercise his muscles in both directions.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described the invention, what is claimed is:

1. A double acting hydraulic cylinder, comprising: an inner tube disposed within an outer tube; head and base members closing the ends of said tubes, each head and base member having a passageway for placing fluid disposed within the inner and outer tubes in fluid communication; a piston slideably mounted within the inner tube for acting on the fluid disposed therein, said piston having a passageway extending therethrough for placing the fluid on one side of the piston into fluid communication with the fluid on the other side; a piston rod for moving the piston mounted with the piston and extending through the head member and for displacing fluid in the inner tube; first valve means mounted with said base member for preventing fluid communication through the base member passageway when said piston moves toward the base member; second valve means mounted with said piston for preventing fluid communication through the piston passageway when said piston moves toward the head member, the valves and piston rod coacting so that upon movement of said piston fluid in said inner tube always flows through the head member passageway from the inner to the outer tube; and means to adjust flow of fluid through the passageway in the head member for controlling the quantity of fluid flow from the inner tube into the outer tube to adjust the magnitude of force necessary to move the piston in either direction.

2. The cylinder as set forth in claim 1, including an accumulating reservoir mounted in fluid communication with the outer tube for storing fluid received from the outer tube as the piston moves toward the base member.

3. The invention as set forth in claim 2, wherein the accumulating reservoir includes a tubular member connected to the base member, a plug moveably disposed within the tubular member, and a spring for urging the plug toward the base member to aid in filling the inner tube with fluid when the piston is moved toward the head member.

4. The invention as set forth in claim 3, wherein the accumulating reservoir includes an end cap with a vent extending therethrough connected to the tubular member, and a rod connected to the plug and extending through an opening in the end cap to maintain alignment of the plug within the tubular member.

5. The invention as set forth in claim 1, wherein said controlling means includes a tubular plug for receiving fluid from the inner tube into its end and a metering orifice extending through a side wall of the plug for regulating the fluid flow into the outer tube.

6. The invention as set forth in claim 5, wherein said controlling means further includes four metering orifices of varying sizes extending radially through the side wall for varying the force necessary to be exerted in moving the piston the fluid flow into the outer tube being controlled by turning the tubular plug to position a different sized orifice in the head member passageway.

7. The invention as set forth in claim 6, wherein said controlling means further includes a knob for turning the tubular plug when positioning the orifices and a spring loaded ball connected to the knob for nesting in recesses in the head member to register the position of each of the four orifices when aligned with the passageway in the head member.

* * * * *